(12) United States Patent
Xiao et al.

(10) Patent No.: US 10,103,946 B2
(45) Date of Patent: Oct. 16, 2018

(54) SYSTEM AND METHOD FOR JMS INTEGRATION IN A MULTITENANT APPLICATION SERVER ENVIRONMENT

(71) Applicant: ORACLE INTERNATIONAL CORPORATION, Redwood Shores, CA (US)

(72) Inventors: Dongbo Xiao, Edison, NJ (US); Thomas Barnes, Whitehouse, NJ (US); David Zhao, Beijing (CN); Jigang Wang, Beijing (CN); Lily He, Beijing (CN); Padmanabha Bhat, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 132 days.

(21) Appl. No.: 14/865,733

(22) Filed: Sep. 25, 2015

(65) Prior Publication Data
US 2016/0094498 A1 Mar. 31, 2016

Related U.S. Application Data

(60) Provisional application No. 62/055,870, filed on Sep. 26, 2014.

(51) Int. Cl.
*H04L 12/24* (2006.01)
*G06F 9/46* (2006.01)
*H04L 29/08* (2006.01)

(52) U.S. Cl.
CPC ............. *H04L 41/20* (2013.01); *G06F 9/46* (2013.01); *H04L 41/0893* (2013.01);
(Continued)

(58) Field of Classification Search
CPC ....... H04L 67/14; H04L 69/329; H04L 51/14; G06F 15/16
(Continued)

(56) References Cited

U.S. PATENT DOCUMENTS 6,922,685 B2 * 7/2005 Greene ............ G06Q 10/06311
2004/0068560 A1 * 4/2004 Oulu .................. G06F 11/3495
709/224

(Continued)

*Primary Examiner* — Tesfay Yohannes
(74) *Attorney, Agent, or Firm* — Tucker Ellis LLP

(57) ABSTRACT

In accordance with an embodiment, a system and method provides a messaging service in a multitenant application server environment. Deployable resources are usable within the multitenant application server environment and groupings of resources are defined by resource group templates within a domain. One or more partitions are provided, with each partition providing an administrative and runtime subdivision of the domain that can be associated with a tenant. Java message service (JMS) resources are defined within a resource group template or a resource group, and instantiated within a partition to enable messaging for applications deployed within the partition and between partitions. Integrating JMS in a multitenant application server environment further includes a foreign JMS server feature which maps remotely hosted JMS connection factories and JMS destinations into a local partition's JNDI, so that bridges and applications in turn gain access to these resources by looking them up in this name-space.

20 Claims, 6 Drawing Sheets

(52) U.S. Cl.
CPC .......... *H04L 41/12* (2013.01); *H04L 41/0843* (2013.01); *H04L 67/10* (2013.01)

(58) Field of Classification Search
USPC .................. 709/204, 206, 224, 227; 370/352
See application file for complete search history.

(56) References Cited

U.S. PATENT DOCUMENTS

| | | | |
|---|---|---|---|
| 2005/0234867 A1* | 10/2005 | Shinkai | G06F 17/30165 |
| 2005/0273787 A1* | 12/2005 | Kovachka-Dimitrova | ................. H04L 67/34 719/310 |
| 2006/0200800 A1* | 9/2006 | Melby | G06F 8/24 717/114 |
| 2007/0208862 A1* | 9/2007 | Fox | H04L 67/14 709/227 |
| 2008/0165762 A1* | 7/2008 | Gilfix | G06F 9/546 370/352 |
| 2011/0137953 A1* | 6/2011 | Bobick | G06F 8/60 707/799 |
| 2012/0254331 A1* | 10/2012 | Chuan | H04L 51/38 709/206 |
| 2015/0006650 A1* | 1/2015 | Basavanna | H04L 51/22 709/206 |
| 2015/0207758 A1 | 7/2015 | Mordani et al. | |
| 2015/0370549 A1 | 12/2015 | Zhang et al. | |
| 2015/0370608 A1 | 12/2015 | Dipol et al. | |
| 2015/0372883 A1 | 12/2015 | Lam et al. | |
| 2015/0372887 A1 | 12/2015 | Inamdar et al. | |
| 2015/0372936 A1 | 12/2015 | Kasso et al. | |
| 2015/0372937 A1 | 12/2015 | Lai et al. | |
| 2015/0373004 A1 | 12/2015 | Hopkins et al. | |
| 2015/0373097 A1 | 12/2015 | Konkus et al. | |
| 2015/0373098 A1 | 12/2015 | Mordani et al. | |
| 2015/0373099 A1 | 12/2015 | Dipol et al. | |
| 2015/0373117 A1 | 12/2015 | Gleyzer et al. | |
| 2015/0378641 A1 | 12/2015 | Patel et al. | |
| 2015/0378938 A1 | 12/2015 | Patel et al. | |
| 2016/0013983 A1 | 1/2016 | Lu et al. | |
| 2016/0014038 A1 | 1/2016 | Thyagarajan et al. | |
| 2016/0014191 A1 | 1/2016 | Liu et al. | |
| 2016/0014212 A1 | 1/2016 | Zhang et al. | |
| 2016/0020949 A1 | 1/2016 | Mares et al. | |
| 2016/0085543 A1 | 3/2016 | Islam et al. | |
| 2016/0088108 A1 | 3/2016 | Felts et al. | |
| 2016/0092278 A1 | 3/2016 | Quinn et al. | |
| 2016/0092319 A1 | 3/2016 | Parkinson et al. | |
| 2016/0092342 A1 | 3/2016 | Inamdar et al. | |
| 2016/0094385 A1 | 3/2016 | Bower et al. | |
| 2016/0094403 A1 | 3/2016 | Somogyi et al. | |
| 2016/0094404 A1 | 3/2016 | Kasso et al. | |
| 2016/0094405 A1 | 3/2016 | Barnes et al. | |
| 2016/0094406 A1 | 3/2016 | Phan et al. | |
| 2016/0094407 A1 | 3/2016 | Parkinson et al. | |
| 2016/0094408 A1 | 3/2016 | Segu | |
| 2016/0094473 A1 | 3/2016 | Mordani et al. | |
| 2016/0094474 A1 | 3/2016 | Sahoo et al. | |
| 2016/0094478 A1 | 3/2016 | Quinn et al. | |
| 2016/0094484 A1 | 3/2016 | Mordani et al. | |
| 2016/0094486 A1 | 3/2016 | Sahoo et al. | |
| 2016/0094510 A1 | 3/2016 | Xiao et al. | |
| 2016/0094582 A1 | 3/2016 | Watson et al. | |
| 2016/0094583 A1 | 3/2016 | Bower | |
| 2016/0094624 A1 | 3/2016 | Mordani et al. | |
| 2016/0094625 A1* | 3/2016 | Sengodan | H04L 67/10 709/204 |
| 2016/0094626 A1 | 3/2016 | Bajaj et al. | |
| 2016/0094627 A1 | 3/2016 | Subramanyam et al. | |
| 2016/0094635 A1 | 3/2016 | Kannan et al. | |
| 2016/0094647 A1 | 3/2016 | Mordani et al. | |
| 2016/0142506 A1 | 5/2016 | Sahoo et al. | |
| 2016/0231998 A1 | 8/2016 | Islam et al. | |
| 2016/0328268 A1 | 11/2016 | Islam et al. | |
| 2017/0017494 A1 | 1/2017 | Patel et al. | |
| 2017/0019467 A1 | 1/2017 | Inamdar et al. | |
| 2017/0019485 A1 | 1/2017 | Dorr et al. | |
| 2017/0034071 A1 | 2/2017 | Sidde et al. | |
| 2017/0116041 A1 | 4/2017 | Nanjudaswamy | |
| 2017/0118137 A1 | 4/2017 | Nanjudaswamy | |
| 2017/0126742 A1 | 5/2017 | Hopkins et al. | |
| 2017/0192772 A1 | 7/2017 | Islam et al. | |

* cited by examiner

SYSTEM AND METHOD FOR JMS INTEGRATION IN A MULTITENANT APPLICATION SERVER ENVIRONMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application claims the benefit of priority to U.S. Provisional Application titled "SYSTEM AND METHOD FOR JMS INTEGRATION IN A MULTITENANT APPLICATION SERVER ENVIRONMENT", Application No. 62/055,870, filed Sep. 26, 2014; and is related to U.S. Provisional Application titled "SYSTEM AND METHOD FOR SUPPORTING MULTITENANCY IN AN APPLICATION SERVER, CLOUD, OR OTHER ENVIRONMENT", Application No. 61/929,888, filed Jan. 21, 2014; which application is herein incorporated by reference.

FIELD OF INVENTION

Embodiments of the invention are generally related to environments for operating application software, and are particularly related to systems and methods for providing and administering messaging services in a partitionable environment for operating application software, such as a multi-tenant cloud or application server environment.

BACKGROUND

Software application servers, examples of which include Oracle WebLogic Server (WLS) and GlassFish, generally provide a managed environment for running enterprise software applications. Recently, technologies have also been developed for use in cloud environments, which allow users or tenants to develop and run their applications within the cloud environment, and to take advantage of distributed resources provided by the environment.

The Java Message Service (JMS) application programming interface (API) is an API usable in application server environments for sending messages between two or more clients. JMS is a messaging standard that allows application components to create, send, receive, and read messages, allowing communication between different components of a distributed application to be loosely coupled, reliable, and asynchronous.

SUMMARY

In accordance with an embodiment, described herein is a system and method for providing a messaging service in a multitenant application server environment. A plurality of deployable resources are usable within the multitenant application server environment and groupings of deployable resources are defined by one or more resource group templates within a domain. One or more partitions are provided, with each partition providing an administrative and runtime subdivision of the domain that can be associated with a tenant. One or more Java message service (JMS) resources are defined within a resource group template or a resource group, and instantiated within a partition from one or more partitions to enable messaging for applications deployed within the partition and between one or more partitions.

In accordance with an embodiment, a system and method for integrating JMS in a multitenant application server environment further comprises a foreign JMS server feature which maps remotely hosted JMS connection factories and JMS destinations into a local partition's Java naming and directory interface (JNDI), so that bridges and applications in turn gain access to these resources by looking them up in this name-space.

DETAILED DESCRIPTION

In accordance with an embodiment, described herein is a system and method for supporting messaging services in a partitionable environment for operating application software. In a cluster, JMS components typically reside on different servers within that cluster, and must be able to work together to enable communication between applications executing on the different servers, as well as between applications executing on different clusters within a partition. Further, under some circumstances it will be desirable to communicate across partitions, or between the domain level and partitions.

Application Server (e.g., Multi-Tenant, MT) Environment

Figure 1:
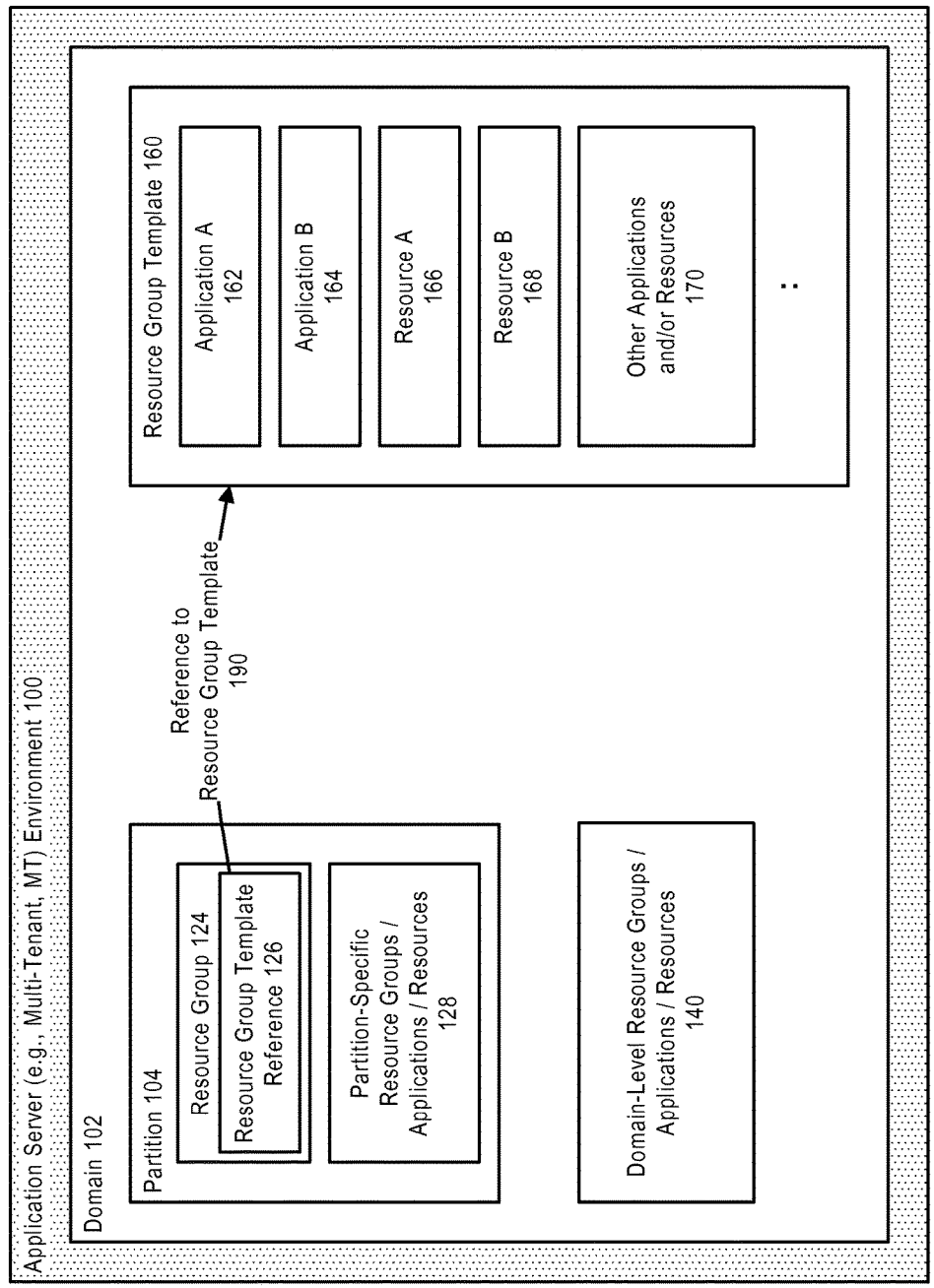
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
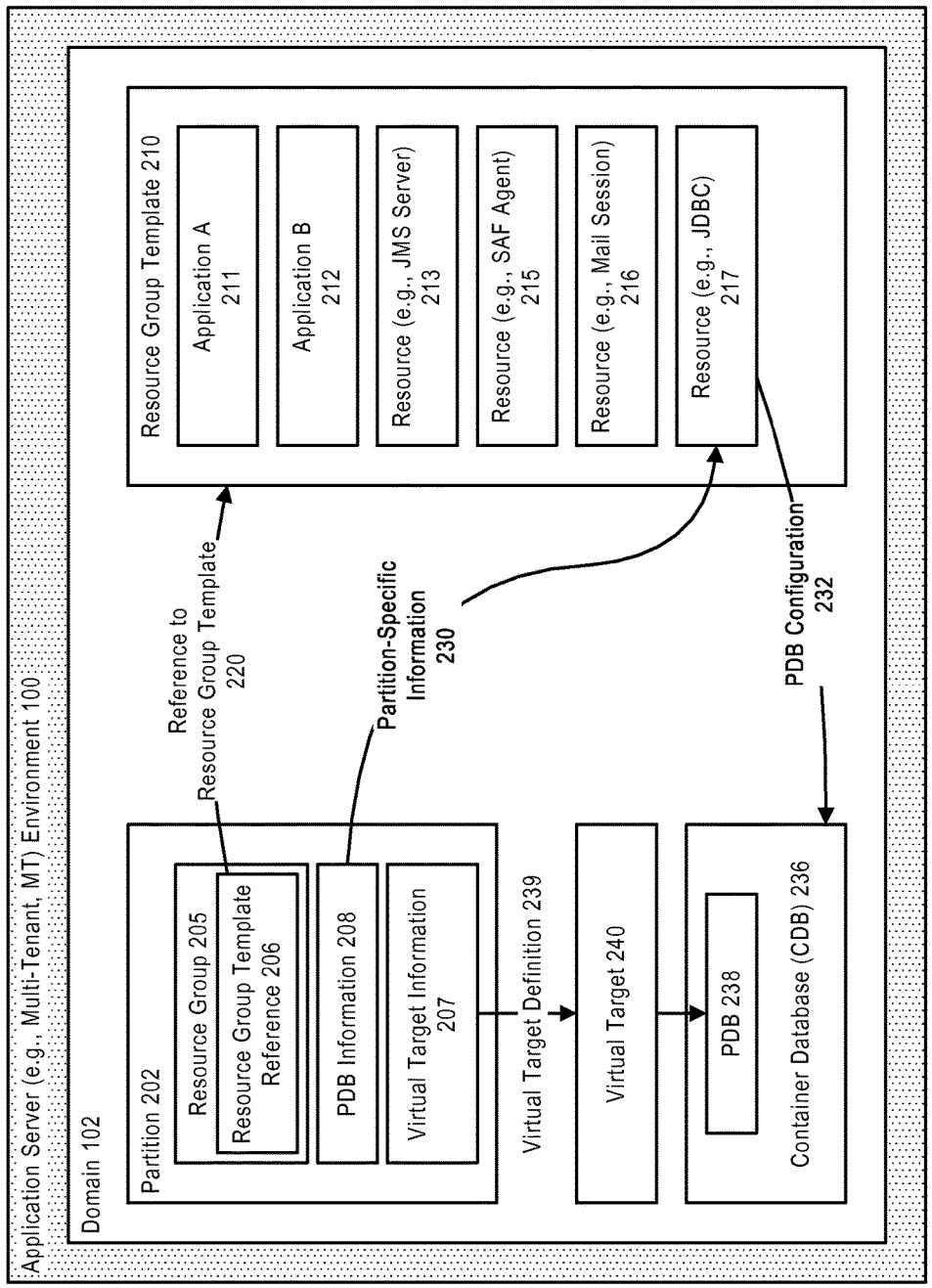
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition. Further, foreign JMS server overrides contain property key values that can provide overrides for resource group templates.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
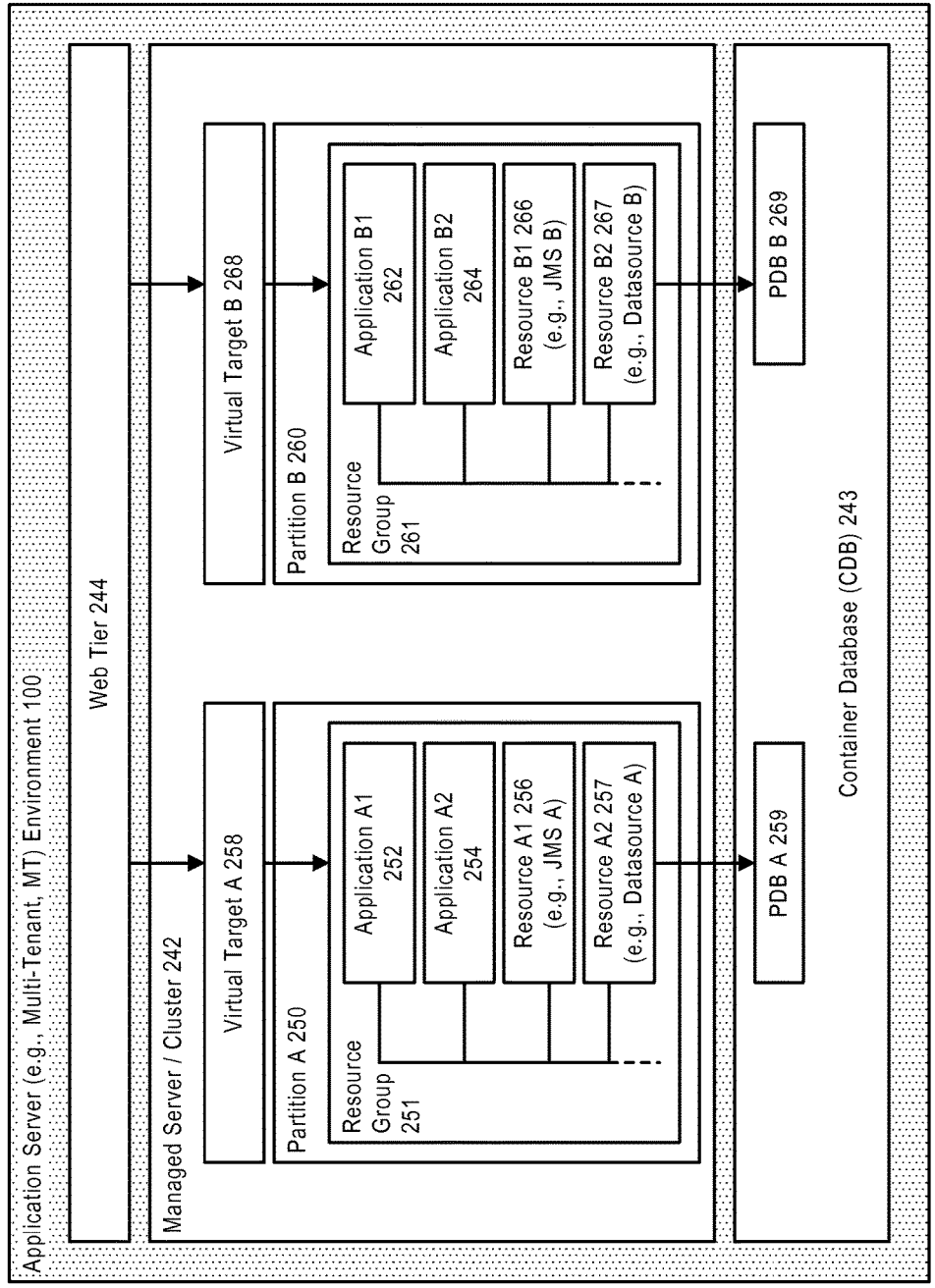
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates. Further, foreign JMS server overrides contain property key values that can provide overrides for resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for an application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a software as a service (SaaS) use case, various partition-level resource groups can refer to domain-level resource group templates; while in a platform as a service (PaaS) use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level. Partition level configuration can instead be specified in the resource group template through the use of macros, other overrides, or property name/value pairs, or, for example, through the use of foreign JMS server overrides which contain property key values that can provide overrides for resource group templates.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRM Data Username}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.

Exemplary Domain Configuration and Multi-Tenant Environment

In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
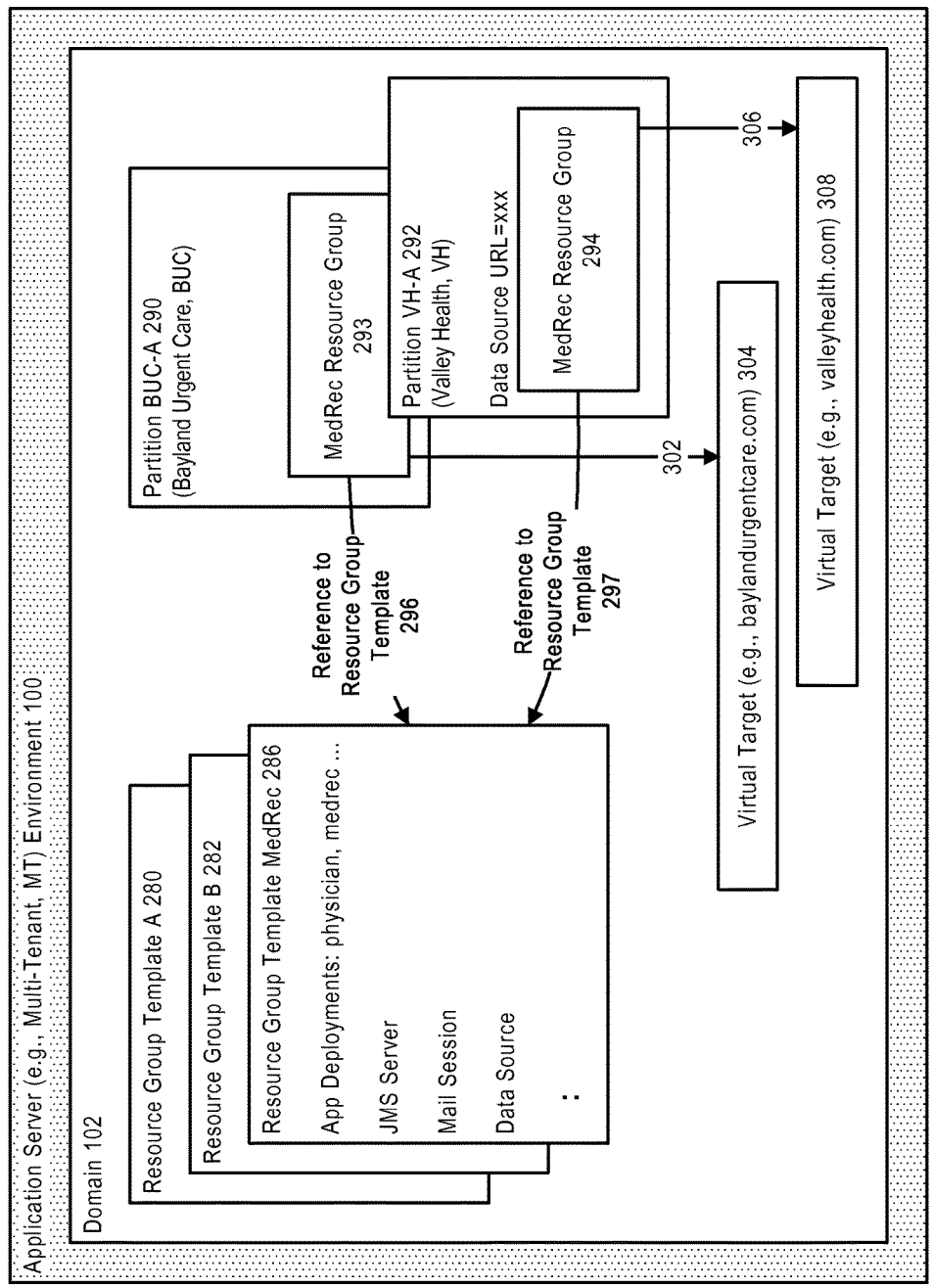
FIG. 4 illustrates an exemplary use of resource group templates, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
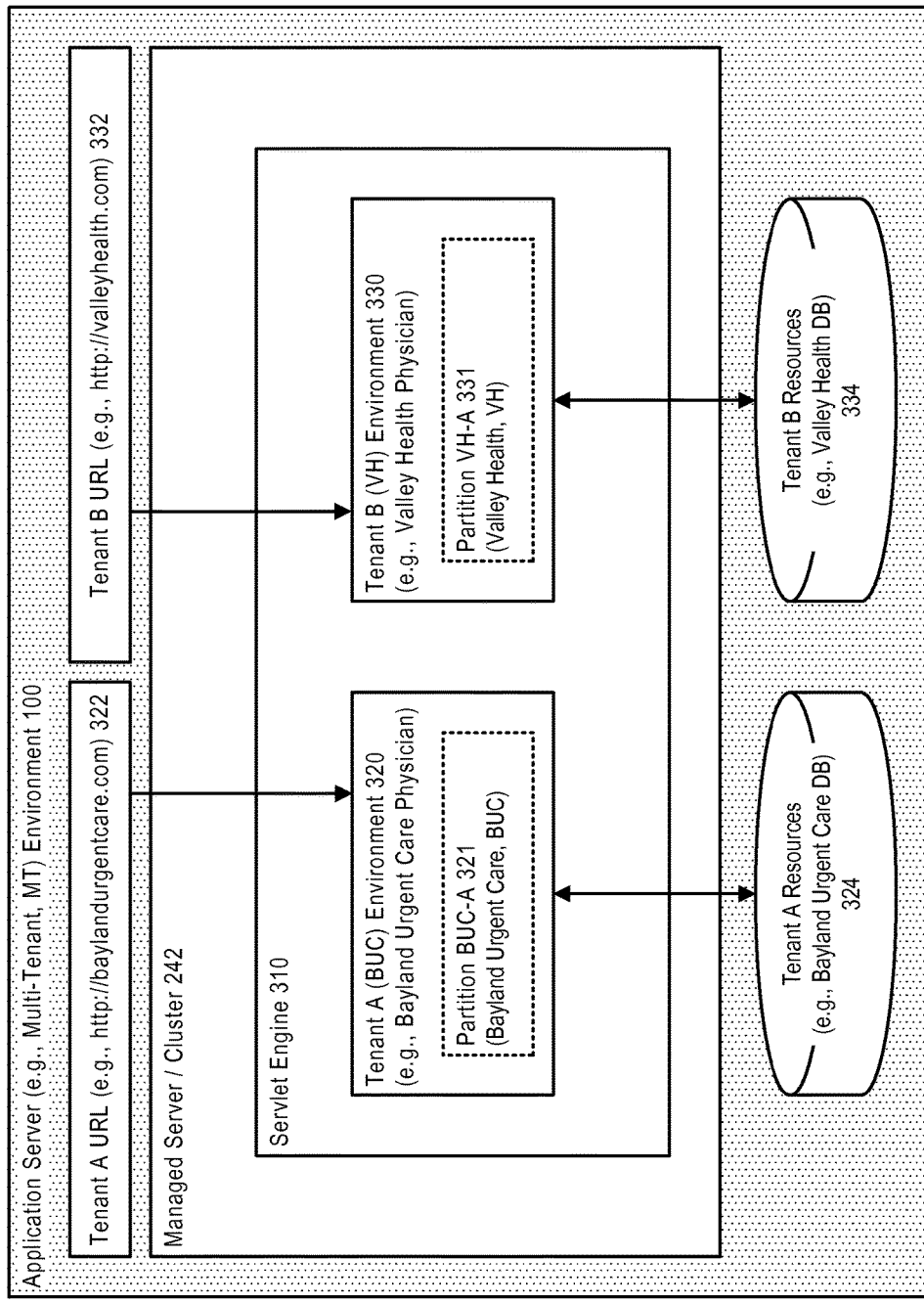
FIG. 5 illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a Bayland urgent care database, or a valley health database respectively. The database instances can use compatible schemas, since the same application code will execute against both databases. When the system starts the partitions, it can create the virtual targets and connection pools to the respective database instances.

Messaging Components for Use in a Partitionable, Multi-Tenant Environment

In accordance with an embodiment, described herein is a system and method for implementing a messaging service that can support cluster targeting in a partitionable, multi-tenant environment for operating software applications. Messaging services will be described hereinafter in the context of Java Message Service (JMS), including exemplary deployments, features and configurations of JMS. However, one skilled in the art will appreciate that the description of JMS is merely exemplary, that JMS is merely one type of messaging service and that embodiments are intended to be applicable to any messaging service usable within a partitionable environment for operating software applications. Further, one skilled in the art will appreciate that a messaging service is merely one type of service, and that embodiments are intended to be applicable to other services, such as a transaction manager, usable within a partitionable environment for operating software applications.

JMS services comprise core JMS components including JMS servers, JMS system modules, JMS application modules, JMS Java clients, C clients and .NET clients, public helper APIs, and path services. JMS services further comprise internal components such as a dispatcher, front-end, back-end and messaging kernel. Further, store-and-forward (SAF) services comprise agents for both JMS SAF and the web services reliable messaging (WSRM) for WebLogic Java API for XML-based remote procedure call (JAX-RPC) web services implementation, and messaging integration comprises integration components for arbitrary JMS providers including messaging bridges, JMS pools, and foreign JMS servers.

Figure 6:
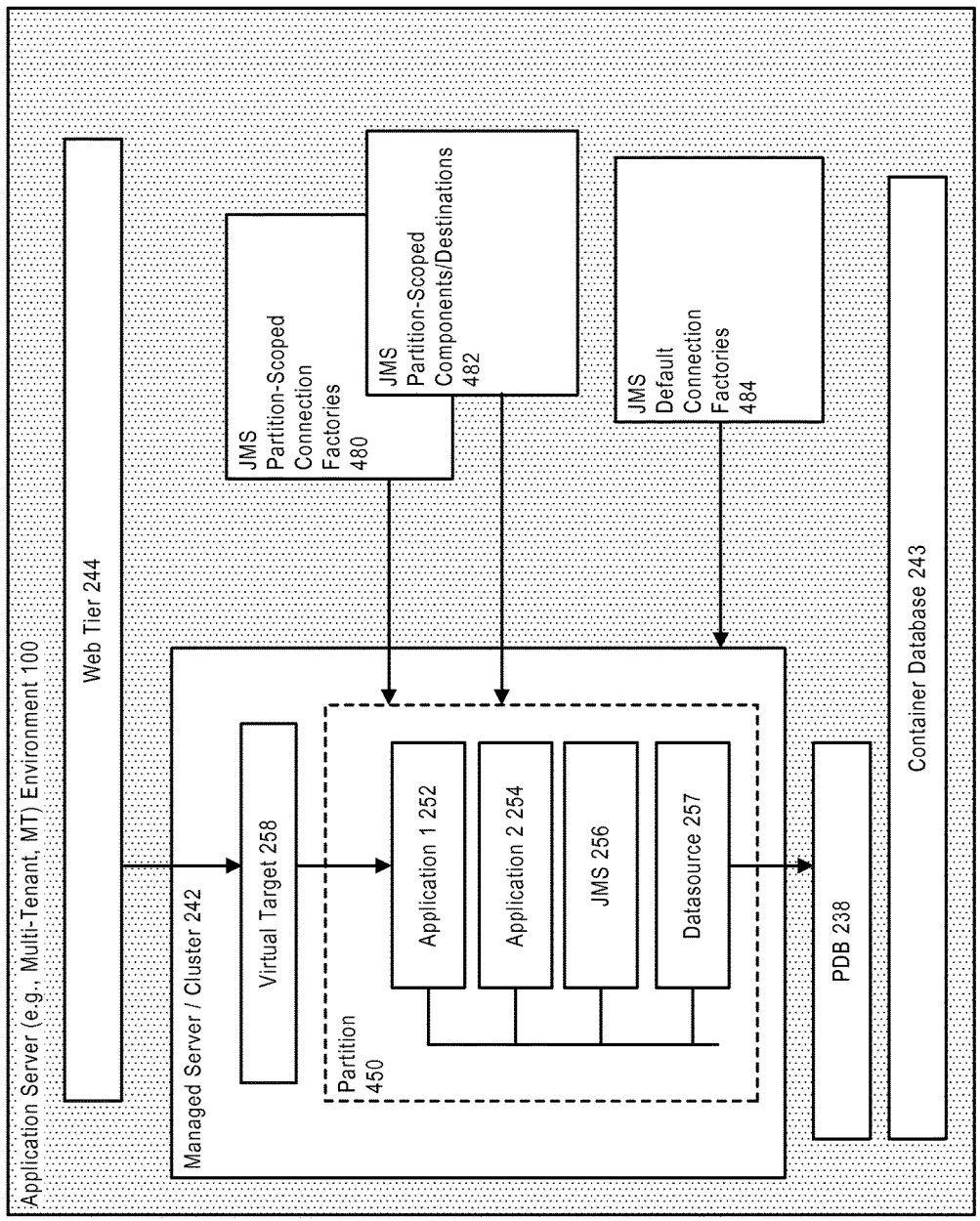
FIG. 6 illustrates messaging in a multitenant application server environment, in accordance with an embodiment.

FIG. 6 illustrates messaging in a multitenant application server environment, in accordance with an embodiment.

JMS messaging components 480, 482 for use in a partitionable, multi-tenant environment, including JMS servers, path services, SAF agents, messaging bridges, JMS foreign server, JMS system modules, and JMS application modules, can be deployed in a partition through resource groups and resource group templates. JMS wrapper/pools can be referenced by an application (e.g., a Java EE application) within a partition using resource references. Partitions can be isolated with respect to one another if a resource group template is referenced by partitions on multiple clusters.

JMS resources can be defined within a resource group template or a resource group and instantiated within a partition to support SaaS and consolidation use cases. JMS components are partition scoped, exist in an isolated JNDI name-space, use partition scoped runtime/configuration MBeans and use isolated persistent storage. JMS connection factories and their child resources are associated with the partition for which they are configured. Default connection factories 484 are deployable to the domain and are available to applications within partitions. Default connection factories are scoped (isolated) to the domain level or to their partitions. They are not directly shared across partitions except that all custom factories (custom and default) are available across partitions using the "domain:" and "partition:" JNDI name prefix, or using URL locators that resolve to the different location.

In accordance with an embodiment, the operations, administration and management (OA&M) service automatically decorates configuration and deployment MBean names with their local partition name, or provides a mechanism for JMS components to do so. The core OA&M, deployment, networking, security and diagnostics services are partition aware by default. For example, when a logger logs a message, the partition ID of the current thread will show in a supplemental attribute of a log message unless the log message is specifically marked as "exclude_partitioned". Core service callbacks, including OA&M, JNDI, diagnostics, and deployment service callbacks, include the local partition ID on the callback thread.

Work manager instances, once created, are associated with a particular partition and run jobs with the partition ID of that partition on the execute thread. If a work manager name exists at the domain level, a findOrCreateWorkManager( ) call from a partition context does not return the global work manager with that name if a local work manager with that name does not exist. Rather, a partition-scoped work manager with that name is created. A timer manager delegate's partition association to the work manager instance that is associated with the timer manager.

Enterprise Javabeans (EJBs), servlets, and message driven beans (MDBs) are fully partitioned. For example, a particular instantiated partition scoped MDB or EJB bean will have the partition ID of its host partition on the current thread.

Data sources and WebLogic remote method invocation (RMI) and/or EJB smart stubs, including JMS connection factory stubs, are associated with the partition from which they are obtained, and do not change their partition based on the current partition on the current thread. APIs are provided for obtaining the partition ID of the current thread, for overriding the partition ID of the current thread with a different partition ID and for obtaining the partition of a smart stub.

A client or partition is able to communicate with one or more destinations on multiple partitions within the same cluster, within different clusters, or within different domains, and can interoperate with previous versions of application servers (e.g., WebLogic servers) that are not executing within partitioned environments. For example, old clients are able to send messages to a particular partition, and a partitioned application will be able to send messages to an application server that is executing in a non-partitioned environment.

Partition Scoped JMS Services

Domain level JMS resource configurations, JMS system resources and JMS modules embedded in deployable modules are supported at the domain level for applications built for non-partitionable or legacy environments.

As mentioned above, in accordance with an embodiment, JMS resources are available for applications for use in partitionable, multi-tenant environments at the partition level via resource group templates or resource groups. JMS resources, such as connection factories, destinations, message bridges and path services are partition scoped, with each resource either belonging to the domain or a particular partition. A resource can exist in multiple partitions with the same JNDI name. An application that uses the correct URL when it creates an initial context to the domain or partition will access the correct resources via JNDI lookup operations.

Persistent application data that a JMS component holds are stored in persistent storage, such as a file store, replicated store or JDBC store. Each partition includes an instance of a file store and replicated store so that the data are in different locations in the file system if configured properly, and JMS applications can achieve isolation of application data, system resources, as well as security, between partitions. Each partition can choose to use a different PDB instance in the same database when using a JDBC store.

A JMS component ensures that system resources, such as threads and memory, are accounted for under the right partition. The JMS component replies on some of the core services to provide object-based partition association.

JMS Server

In accordance with an embodiment, core messaging components include JMS servers. A JMS server can include, for example, a WebLogic server service that provides messaging capability via Java EE standard interfaces and additional WebLogic extensions.

The core messaging components are deployable in a partition via resource groups and resource group templates, and inherit the target of the resource group and partition to which they belong. An exception is thrown if a resource within a resource group has its own target. For non-partitionable environments, or other legacy configurations, configuration entities are directly targeted to a server, a cluster, or a migratable target. In accordance with an embodiment, a migration tool can be used to null out the targeting of existing resources when migrating the resources to a partitionable, multi-tenant environment, for example from a non-partitionable environment (e.g., a legacy environment).

A cloned instance of a resource includes a name that is automatically decorated with the local partition name. Instance names can be generated based on configuration MBean names, which are automatically decorated with the current partition name by the OA&M service. Cluster targeted JMS server names embed the name of an application server (e.g., a WebLogic server). For further disambiguation some internal artifacts, such as XA resources, are decorated with the current domain name.

Partition Scoped JMS Modules

In accordance with an embodiment, messaging includes separate configuration modules that can be targeted at clusters or individual servers, and optionally associated with particular JMS servers within this targeting scope via subdeployments. There are two types of modules: system modules which can be referenced from the config.xml file of a domain and configured via MBeans and console, and application modules which can be embedded within an application.

JMS module artifacts, such as JMS connection factories, JMS server distributed and singleton destinations, and foreign JMS server references, can be configured at a global level as well as at a partition level. Once configured within a partition, the JNDI names for the module artifacts are registered in the JNDI namespace that corresponds to the partition of the JMS module. In accordance with an embodiment, the namespace for system modules is the global JNDI namespace, while the JNDI namespace for application modules is the JNDI name space of the component. The subdeployment targets of a JMS module are in the same partition as the JMS module itself.

A Java EE application, such as a message driven bean (MDB), deployed in a partition can access domain level JMS resources, or partition level JMS resources in the same partition or in a different partition in the same cluster, a different cluster or a different domain generally via JNDI. JMS resources at the domain level and partition level are isolated from each other even if they have the same name.

A physical JMS system module file is referenced by one resource group template in one domain. Similarly, for the non-templated consolidation use case, a physical JMS system module file is referenced by one resource group.

In accordance with an embodiment, internal OA&M configuration MBeans for these resources may have names that are automatically decorated with partition names by the OA&M component, but in general, public configuration MBeans are not so decorated. Regardless, the entity names are unique within their scope within a server when the configuration callbacks get into the JMS layer. In some embodiment, partition information is stripped from the name of a JMS runtime MBean that derives its name from the name of an internal configuration MBean that has name decoration.

Some module artifacts can include configurable attributes, including credentials and URLs, customized on a per partition basis. Per partition customization can be achieved by a macro substitution mechanism available via partition properties for artifacts within a resource group template and does not apply to configurable artifacts in a JMS module file that is referenced from a jms-system-resource or an add-deployment in the resource group template. Per partition customization can also be achieved by an MBean that handles customization of PDB configurations. Per partition customization can also be achieved by an application deployment plan that overrides some of the application deployment settings, for example via an MBean mechanism. Per partition customization can also be achieved via foreign JMS server overrides which contain property key values that can provide overrides for resource group templates.

Default connection factories can be enabled and disabled on a per server basis. Once enabled on an application server (e.g., a WebLogic server) default connection factories are available in all partitions running on that application server. Once disabled, the default connection factories are not available in any partitions on the server.

Messaging Bridges

A messaging bridge is a configurable service that forwards messages from one designated destination to another designated destination. A destination can be any JMS destination, and messaging bridges can forward messages between WebLogic destinations and non-WebLogic destinations. Messaging bridges can be configured at the domain level, and within resource groups at both the domain level and the partition level. Messaging bridges can be targeted at application servers (e.g., WebLogic servers), migratable targets, and clusters, but when part of a resource group, messaging bridges inherit the target of the parent partition or resource group. The URL, username and password elements for a messaging bridge destination configuration can be overridden by the macro substitution mechanism via partition properties. Further, foreign JMS server overrides can provide overrides for resource group templates.

The thread pool size of a work manager that a messaging bridge instance uses is configured on a per application server basis, and optionally on a per partition basis. Resource adapters for use with messaging bridges are supported at both the domain level and the partition level. A messaging bridge uses a resource adapter that is automatically configured and deployed in the same partition/domain-level as the bridge instance, and there is no need to manually configure the adapter.

Resource Reference Pooling

In accordance with an embodiment, JMS supplies a JMS pooling/wrapping library that works with any JMS provider and that is used for multiple purposes. The library pools JMS Connections, enforces Java EE restrictions on JMS usage, enlists non-WebLogic JMS providers with WebLogic Java Transaction API (JTA) transactions, has runtime MBeans, and aids with security handling.

The library enables application containers to automatically and transparently supply JMS connection resource reference pooling/wrapping for connection factories obtained via EJB or servlet resource references. The library is further used by MDBs to wrap their internal connections.

Resource reference pools are automatically instantiated upon use of a resource reference and are not configured, but have runtime MBeans that are decorated with the current partition name. A resource reference pool is not shared by multiple partitions.

Client Access

In accordance with an embodiment, messaging provides asynchronous communication between application components. Communication can cross the boundary of partitions on the same cluster, different clusters and even different domains. An arbitrary messaging thin Internet Inter-ORB Protocol (IIOP) client, thin T3 client, thick/full Java client or non-partitioned server-hosted application client is able to access a partition-scoped JMS resource that is on a remote application server (e.g., WebLogic server). In addition a server-side application from one partition can access JMS resources of another partition on the same server, same cluster, and same domain.

JMS client connections can be permanently associated with the partition from which they obtain their connection factory, and do not change their partition based on what is on the current thread. When JMS pushes messages or exceptions to an asynch listener, the local partition ID of the listener will be resumed, rather than the partition of the destination.

In accordance with an embodiment, a JMS application is able to access a JMS resource that is running in a different JVM or cluster via the WebLogic T3 protocol. The application needs to supply a partition URL besides a JNDI provider URL which establishes the initial context. For example, the application can supply a partition URL such as (1) t3://virtualhostname:port, which requires configuring virtual hosts, (2) t3://host:portURl, where the URl is often configured to be the same as the partition-name, or (3) via t3://host:port, where the port has been dedicated for use by a specific partition. A virtual host need not be configured to support the latter two methods.

For interoperability, an application that is not designed for running in a partitionable, multi-tenant environment is able to access a JMS resource in a partition by using method (3). Further, a JMS application in one partition or at the domain level is able to access a JMS resource in a different partition that is running on the same JVM without requiring the provider URL.

Create Destination Identifier Syntax

In accordance with an embodiment, an alternative technique for looking up a destination or member of a distributed destination that does not use JNDI includes using a create destination identifier (CDI). CDI uses createQueue/createTopic/createDestination methods to reference a destination. The JMS server configuration MBean name can be used to identify a destination if the application does not use an explicitly configured CDI. Since the session object is scoped to a particular partition in a partitionable environment, the createQueue/createTopic/createDestination call is usable within the partitionable environment. A call is scoped to the right partition or to domain level JMS resources.

Integration with JNDI Services

In accordance with an embodiment, JMS relies on a JNDI service to provide JNDI entry isolation among partitions. The entities that the JMS binds into JNDI on behalf of JMS module deployment include connection factories, destinations, and foreign JMS servers. The partition ID is on the thread when JMS is called upon from deployment runtime and JMS creates the initial context and binds these entities using the thread in order to ensure that these entities are bound into the correct JNDI name-space. JMS can also use JNDI for internal purposes, binding internal entities using local (no parameters) initial contexts.

An initial context, including an initial context with no-URL, can be associated with the partition within which the initial context is created. A context object can be relied upon regardless of whether there is a partition ID on a thread. For example, if the context is established to PartitionA, all subsequent lookup or binding can be on behalf of that partition independent of what is on the thread. The system can provide JNDI context support object-based partition association and a default behavior to prevent breaking legacy customer apps, JMS and non-JMS included.

JNDI supports the same name at both a global level and in different partitions, as they are isolated from each other. A lookup operation using a partition-scoped initial context will not look into the domain level JNDI area and vice-versa.

Integration with Work Managers

Messaging components for non-partitionable and legacy environments (e.g., WebLogic servers) use system and default work managers in various places. In addition, they create a few different dedicated custom work managers for internal messaging use.

In accordance with an embodiment, messaging components for a partitionable, multi-tenant environment can support thread isolation via a default work manager in each partition. For example, if a WorkManagerFactory.getInstance( ).getDefault( ) is called in the context of partitionA, it will provide the default work manager for partitionA. If a request is scheduled using this default work manager from any thread with any partition context, the context of partitionA will be in the execute thread when the request is executed.

Further, when a WorkManagerFactory.getInstance( ).findOrCreate( ) is called within a partition context, a partition-scoped work manager with the given name is created if none is found associated with the partition, even if there is a same-named work manager in the global scope. The work manager that is created will behave as would a default work manager for a partition. Still further, each request can optionally override the partition of a work manager on a per request basis via a ComponentRequest interface or a schedule( ) method. For partition scoped JMS components, partition-specific work managers are used when possible.

Integration with the Security Service

In accordance with an embodiment, security realms are configured at a domain level and referenced from partitions. There can be multiple active security realms in a domain. When authentication or authorization is performed, the partition ID is required to determine the realm to use.

Messaging components that need to make authentication or authorization checks verify integration with the security service either by having the right partition ID on the thread while calling security service interfaces or by using partition-specific interfaces. JMS modules and destination access policies can be configured at the partition level.

Cross-domain security can be enabled and/or disabled at the domain level, while the actually credential mapping settings are in the realm that a partition uses.

Integration with JTA Transactions

In accordance with an embodiment, messaging components integrate with JTA by creating XAResources via the store component, start and commit transactions, and enlist in transactions. JTA is substantially non-partitioned, except that default tx timeouts are settable at the partition level and runtime diagnostics filter by tenant.

WebLogic JMS will implicitly decorate its partitioned XAResource names with the appropriate partition name. The store XA resource name is constructed based on the store MBean name, and the MBean name of a partitioned store will be decorated with the partition name by OA&M. Global transactions can cross partition boundaries. JMS ensures that the partition ID of the current partition is on the current thread for all JTA calls.

Partition-Scoped Monitoring/Diagnostics/Logging

In accordance with an embodiment, administrators of a partitionable, multi-tenant environment can monitor messaging runtime state, monitor statistics, and perform runtime operations via JMS runtime MBeans. For partition-scoped JMS resources, the runtime MBeans are created and registered with the administration server in the context of a partition.

Messaging components can register the top level MBeans (e.g., JMSRuntime, SAFRuntime, PathServiceRuntime, JMSPooledConnectionRuntime, and MessagingBridgeRuntime) with the right partition MBean instance to achieve correct runtime MBean hierarchy. For the runtime MBeans that are corresponding to a configuration MBean, their names are derived from the name of the configuration MBean, which are automatically decorated with their partition name. Optionally, the partition information can be stripped from the names of those runtime MBeans.

For domain and server logs in a non-partitionable or legacy environment (e.g., WebLogic server), JMS components write log messages into server and domain log files. In a partitionable, multi-tenant environment, log records are identified which must not be generated in the context of a partition. The current partition in partitioned component log messages is reported by default. The logging framework ensures that this happens automatically based on the partition ID of the current thread. The "exclude_partitioned" attribute is set in the catalog entry of a log message for partitioned component log messages that should not be exposed to a partition administrator.

For JMS messaging life-cycle logs, JMS server can optionally be configured to log application message lifecycle events to a dedicated log file location. In a partitionable, multi-tenant environment, if the JMS server is in a partition, the name of the log file is modified to contain the partition information, for example the partition name.

Partition-specific log files can be retained in a partition-specific directory if a relative location is configured. By default, these log files will be in the partition specific directory in the domain directory, although an administrator can configure an absolute path.

When image capture is initiated by a partition administrator manually, or with a watch rule in a partition scoped WLDF system resource, only partition specific content will be included in the result diagnostic image. Diagnostic image capture callbacks will have the expected partition ID on the callback thread.

JMS enables special operations with diagnostics contexts, including propagating it from a sender thread, to its messages, and finally on to the receiver of the message. In accordance with an embodiment, in a partitionable, multi-tenant environment, as long as a JMS component has the right partition associated with the current ComponentInvocationContext when the same thread transits to different partitions, the partition info in the diagnostics context will be correct.

Integration with the Timer Service

Messaging components use a timer service for various timeout and periodical operations. Each timer manager is associated with a work manager. A timer manager is scope to a partition implicitly and transitively by specifying a partition scoped work manager for use in the timer's callbacks. If a work manager is not specified, a default work manager is used. The work manager ensures that the execute thread of a callback will have the right partition ID.

The timer manager by default delegate's partition context association to the work manager that is specified when the timer manager is created. The timer listener type has nothing to do with the partition context propagation, and similarly the context on the thread when a timer is scheduled has nothing to do with the partition context propagation.

Integration with Partition Life-Cycle

In accordance with an embodiment, a partitionable, multi-tenant environment can support partition scoped life-cycle operations, which includes the shutdown and restart of individual resource groups or entire partitions independently of the shutdown and restart of individual JVMs or clusters. For example, if a resource group is shutdown and it contains JMS server configuration, the JMS servers configured within the resource group will shutdown while the remaining JMS servers in the domain will continue to run.

Integration with Partition Configuration Migration

In accordance with an embodiment, a partitionable, multi-tenant environment can support partition migration from one cluster to another cluster. As described above with respect to JMS stores, partition migration is problematic in general for messaging component state as application data may be trapped in an old location. In order to avoid data loss, application messages can be required to be completely drained and all pending transactions completed before undeploying or removing a JMS server.

Resource group migration from one cluster to another within a partition is supported for AQ JMS, as AQ JMS generally doesn't have singleton data that's tied to a cluster. AQ JMS supports resource group multi-targeting, resource group data migration and JNDI bind/unbind, and partially supports client transparency.

Resource multi-targeting is a resource group migration feature that allows a resource group to temporarily run concurrently in two clusters. Resource group data migration stores messages in the database in a central location accessible from either cluster that participates in a resource group migration. JNDI bind/unbind support provides that when a resource group bootstraps, its foreign JMS mappings are bound into its partition's name-space in the current cluster. When a resource group migrates away from a cluster, any of its foreign JMS mappings will be unbound from JNDI.

Client transparency is partially supported in that during a migration, server side applications may generate exceptions and log messages depending on the nature of the application and the order that applications and services are shutdown. Java SE AQ JMS clients will get exceptions on an attempt to use a WebLogic JNDI context connected a server that's been cycled for zero down time—and will need to recreate their JNDI context.

Object-Based Partition Association

In accordance with an embodiment, in a partitionable, multi-tenant environment, JMS uses an object-based partition model rather than a thread-based partition ID association model alone because some JMS features require one thread to work with different application resources that are potentially in different partitions, clusters and even domains. For example, a messaging bridge may receive messages from a destination in one partition and forward them to a destination in another domain. Unless the partition ID is associated with JNDI context and JMS connection object-based, the messaging bridge has to switch partition ID on a per call basis. Further, it is common that a JMS application may cache a JMS object and uses it in a thread that is different from the one that establishes the initial context. As result, JMS connection factories that are obtained from a particular partition remain permanently associated with that partition regardless of the partition ID that is on the current thread.

JNDI initial contexts use a thread-based partition ID pattern, yet messaging internals, messaging applications, and even non-message applications very likely need them to use an object-based partition ID association approach similar to the one used for messaging. For example, when a context is created for a virtual host or a URL with a partition name, the context object should remember the partition ID so that all subsequent lookups and bindings are done within the context of the partition. This stickiness needs to remain even if the context is used by a different thread than was used to create the context.

In addition, context creation should not change the partition ID of the current thread. An object-based initial context can simplify messaging internals, and can ensure that customer applications that directly use contexts for messaging and non-messaging purposes will work correctly when multi-threading or when attempting cross-partition communication. This eliminates the need for clients and internal code to manually ensure that the right partition is on a thread that happens to work with more than IC to more than one partition. It can also eliminates the need for clients to move a partition from thread to thread even when it works with a single IC, otherwise the lookup may mistakenly use a null or a local partition that is on the current thread).

In accordance with an embodiment, loggers can be provided with an object-based partition ID option. This can reduce the need to push/pop a partition ID in messaging paths that are associated with a particular partition, but may be called using threads from multiple different partitions.

New JNDI Namespaces

In a partitionable, multi-tenant environment, inter-partition communication inside one application server should not require applications to use network address URLs. In accordance with an embodiment, a JNDI Context in one partition is permitted to access JNDI entries in any other partition within the same cluster or the same server. One can access another partition from the context of a local partition by prefixing a JNDI name with "partition:<partition-name>". To access a legacy global domain JNDI scope, a JNDI name can be prefixed with "global:". For accessing a remote partition, a T3 URL can be decorated with a partition-name or URI so that a customer is not required to configure a virtual host.

JMX MBean Naming

In accordance with an embodiment, the OA&M layer decorates configuration MBeans and JMS system resources with the name of the Partition when it clones those configuration artifacts in a resource group template. The syntax is config-name$partition-name (for example, MedRec-jms-$ValleyHealth). The PartitionRuntimeMBean is added into the runtime MBeans hierarchy between ServerRuntimeMBean and the root runtime MBean of a component (say JMSRuntimeMBean).

Integration with AQ JMS

In accordance with an embodiment, in a partitionable, multi-tenant environment, JMS can use the JMS foreign server framework to allow applications and stand-alone clients to lookup JMS connection factories and destinations using a standard JNDI context, and to allow applications and clients to load and invoke JMS using standard Java EE APIs. The required references to the database, JDBC driver, and data source are configured as part of the framework. Such embodiments of JMS will be referred to hereinafter as Advanced Queueing (AQ) JMS.

Foreign JMS server integration in a partitionable, multi-tenant environment is generic to all providers. Foreign JMS servers can provide some additional capability to make AQ JMS integration straight-forward via JDBC connections. However, other JMS providers need not rely on JDBC connections and can be wired in via typical foreign JMS, including JMS providers executing in a different cluster and/or domain.

For applications running within a JVM a configured data source references a particular JDBC driver, pools JDBC connections, and provides connectivity to the database hosting AQ JMS. A configured foreign server references the data source. Local JNDI names are defined for AQ JMS connection factories and destinations as part of the JMS foreign server configuration. These JNDI names are configured to map to existing connection factories and destinations. Applications, such as MDBs, reference the local JNDI names.

All generic JMS integration components that AQ JMS integration requires, including JMS foreign servers, messaging bridges, MDBs, JMS Wrappers/Pools, JMS system modules, and JMS application modules, are deployable within a partition through the use of resource groups and resource group templates.

Messaging bridges, server hosted applications, and stand-alone client applications are able to access partitioned AQ JMS clients via a foreign JMS server configuration that is contained within a JMS system module or application module (e.g., for a WebLogic server). The foreign JMS server feature maps remotely hosted JMS connection factories and JMS destinations into the JNDI of a local partition, and message bridges and applications gain access to these resources by looking them up in this name-space.

When used specifically to support AQ JMS clients, a foreign JMS server can be configured to reference the JNDI name of an application server (e.g., WebLogic Server) hosted data source. This accommodates the wiring of an AQ JMS client to database hosted AQ destinations. To access the database, server-side AQ JMS connections implicitly leverage the specified data source to obtain JDBC connections from its pool, and client-side AQ JMS connections implicitly create direct JDBC connections to the database using configuration obtained from the configuration of a server-side partition-scoped data source.

JMS integration components can be fully partition scoped in a fully isolated JNDI name-space and can use partition scoped runtime and configuration MBeans. In addition, the AQ connections and destinations that are accessed via these components can also be partition scoped. The AQ JMS connections and destinations use the data source of the current partition to connect to the partition's database (e.g., a dedicated PDB) and to store data in this database.

A configurable override facility provides for optionally customizing the foreign JMS server URLs, usernames, passwords, and mapped remote queue names of a resource group template or resource group on a per partition basis.

Partition Scoped WebLogic Server Integration Tooling

In accordance with an embodiment, WebLogic Server provides the JMS integration facilities that can be leveraged to simplify AQ JMS integration, as well as help automatically handle use of AQ JMS in a partitionable, multi-tenant environment. These correspond to existing services that will be made multi-tenant aware. They can be configured or deployed in a resource group template or a resource group, and will implicitly launch the associated services.

Foreign JMS server definitions are an administratively configured symbolic link between a JNDI object in a remote JNDI directory, such as a JMS connection factory or destination object, and a JNDI name in the JNDI name space for a stand-alone WebLogic server or a WebLogic cluster. They can be configured using the Administration console, standard JMX MBean APIs, or programmatically using scripting.

In the case of AQ JMS, foreign JMS servers have additional capabilities. A data source JNDI Name can be configured in the foreign JMS server so that AQ can implicitly use WebLogic server hosted JDBC connections from the data source, and optionally a URL for use by WebLogic client JVMs. Clients implicitly setup a direct JDBC connection to an ODB AQ queue or topic using the configuration embedded within the foreign JMS server.

In accordance with an embodiment, in order to support foreign JMS servers in a partitionable, multi-tenant environment, in a partition, the data source JNDI name that is configured in an foreign JMS server can be used to lookup a data source and obtain a connection for the partition's PDB, and on a client, the JMS connection factory that is returned contains a URL that is specific to the PDB for the JNDI name-space of the partition that client is communicating with. If the URL is not configured on the foreign JMS mapping, it will be automatically determined based on the data source JNDI name that is specified in the foreign JMS server configuration and the partition's configured PartitionPDBInfo—the same configuration that is used for data sources. Preferably, a foreign JMS server is configured to reference a data source that is in the same partition.

MDBs will supply a partitionable, multi-tenant environment via an isolated deployment per partition. MDBs will be allowed to share work manager thread pools between partitions if desired. They will ensure that an onMessage callback thread is properly scoped to the MDB's host partition.

WebLogic MDBs can leverage the foreign JMS server feature to integrate with AQ JMS. The foreign JMS server capabilities in a partitionable environment can be used to ensure that an MDB in a partition will consume from destinations that access the right PDB. It is the responsibility of the MDB container to lookup an MDB's Connection Factory and Destination using the JNDI name space that matches the MDB's host partition.

WebLogic server messaging bridges are administratively configured services that run on a WebLogic server. They automatically forward messages from a configured source JMS destination to a configured target JMS destination. These destinations can be on different servers than the bridge and can even be foreign (non-WebLogic) destinations. Messaging bridges depend on a variety of core services, including JCA connectors, which, in turn are expected to support partitions.

Messaging bridges are configurable within a partitionable, multi-tenant environment as part of a resource group template or resource group. A single configured messaging bridge for a partition will start a messaging bridge instance on each JVM in the partition's cluster. The instance can be monitored, stopped, or started via per-partition runtime MBeans.

Messaging bridges automatically support AQ JMS in a partitionable environment transitively via foreign JMS server. For a Bridge to work with an AQ JMS foreign JMS server, the foreign JMS server must be configured in the same partition as the messaging bridge or at least the same cluster.

In addition, WebLogic server core services supply tooling for use in partitionable environments that is directly leveraged by some JMS users. Specifically, this tooling includes APIs for obtaining the current partition context and for setting the current partition context ("executeAs"). Support for clients is also included that access a particular partition's JNDI via virtual hosting or a partition URL.

Server Hosted Applications

The following integration approaches use a foreign JMS server that references the JNDI name of a data source: MDB (including WebLogic Server-Async), server EJB/servlet Java EE application, messaging bridge, and SOA adapter.

Raw (non-Java EE) applications that do not directly run in standard Java EE containers but still run on the server JVM can use a foreign JMS server that references a data source JNDI name in combination with core tooling. Raw applications include BI Publisher and UMS. An example of a foreign JMS server configuration for WebLogic server hosted applications (in a jms module xml file) is as follows.

```
<foreign-server name="ForeignServer-0">
    <default-targeting-enabled>true</default-targeting-enabled>
    <foreign-destination name="ForeignDestination-0">
<local-jndi-name>com.oracle.medrec.jms.PatientNotificationQueue
</local-jndi-name>
        <remote-jndi-name>Queues/userQueue</remote-jndi-name>
    </foreign-destination>
    <foreign-connection-factory name="ForeignConnectionFactory-0">
        <local-jndi-name>com.oracle.medrec.jms.connectionFactory
        </local-jndi-name>
        <remote-jndi-name>XAConnectionFactory</remote-jndi-name>
```

-continued

```
    </foreign-connection-factory>
<initial-context-factory>oracle.jms.AQjmsInitialContextFactory</initial-context-factory>
    <jndi-property>
        <key>datasource</key>
        <value>jdbc/MedRecGlobalDataSourceXA</value>
    </jndi-property>
</foreign-server>
```

The core tooling is used to ensure that the correct partition is used to obtain the foreign JMS server and its implicit data source.

Client Applications

The foreign JMS server registered AQ JMS connection factory that is returned to a client from a partition JNDI lookup will transparently contain the URL for the PDB that backs the partition, as described above.

There are two options for configuring this URL. Firstly, foreign JMS can be configured to reference a data source in the same way that is done for server side applications. In this case, no data source will run on the client, but clients will implicitly create a direct JDBC connection to the database using the URL specified in the server side data source configuration. Secondly, foreign JMS can be configured with an explicit "db_url" property. In addition, for resource group templates that are deployed to multiple partitions, configure a per-partition override for the URL to scope the URL to the desired database instance.

An example of the second approach is as follows:

```
<foreign-server>
<initial-context-factory>oracle.jms.AQjmsInitialContextFactory
</initial-context-factory>
...
    <jndi-property>
        <key>db_url</key>
        <value>jdbc:oracle:thin:@{hostname}:{port}:{sid}</value>
    </jndi-property>
</foreign-server>
```

In accordance with an embodiment, when used to access AQ JMS, server-side foreign JMS messaging integration components wire AQ JMS into the current JTA transaction implicitly via data source obtained database connections, which automatically enlist a JDBC connection with the current transaction. Stand-alone client AQ JMS does not use data sources and does not participate in JTA transactions.

Compatibility and Interoperability

In accordance with an embodiment, JMS allows JSE AQ JMS clients to automatically obtain the URL that is associated with a data source via a AQ JMS foreign JMS server mapping. This eliminates the need to specifically configure a URL for a foreign JMS mapping that is used by JSE clients in most cases, since most of the time a data source will already be configured on such a mapping.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for integrating a Java Message Service (JMS) application programming interface (API) in a multitenant application server environment, comprising:
   one or more computers, including an application server environment executing thereon, together with a plurality of deployable resources which can be used within a domain of the application server environment, and
   a plurality of partitions, wherein each partition provides an administrative and runtime subdivision of the domain that can be associated with a tenant, and wherein each partition includes a data source declared for use by applications deployed to the partition;
   a directory service API configured to allow a client to look up data and objects via a name-space associated with each partition of the plurality of partitions;
   a foreign JMS server within a partition from the plurality of partitions which maps resources including JMS connection factories and JMS destinations hosted remotely from the partition into a name-space associated with the partition, so that bridges and applications can access the resources by looking up names of the resources in the directory service API via the name-space associated with the partition;
   wherein the foreign JMS server automatically decorates configuration and deployment MBean names with the partition name; and
   wherein the foreign JMS server is usable to customize configurable attributes for the partition via overrides containing property key values; and
   a database associated with the partition and isolated from others of the plurality of partitions;
   wherein a name for a data source identified by the directory service API is configured in the foreign JMS server to enable a client to connect with the database associated with the partition via a Java Database Connectivity (JDBC) API connection provided by the data source.

2. The system of claim 1, wherein the foreign JMS server can be configured to reference the JNDI name of a hosted data source.

3. The system of claim 2, wherein the hosted data source is hosted at an application server.

4. A method for integrating Java Message Service (JMS) application programming interface (API) in a multitenant application server environment, comprising:
   providing, at one or more computers, including an application server environment executing thereon,
      a plurality of deployable resources which can be used within a domain of the application server environment,
      a plurality of partitions, wherein each partition provides an administrative and runtime subdivision of the domain that can be associated with a tenant, and wherein each partition includes a data source declared for use by applications deployed to the partition;
   providing a directory service API configured to allow a client to look up data and objects via a name-space associated with each partition of the plurality of partitions;
   providing a foreign JMS server within a partition from the plurality of partitions which maps JMS connection factories and JMS destinations hosted remotely from the partition into a name-space associated with the partition, so that bridges and applications can access the resources by looking up names of the resources in the directory service API via the name-space associated with the partition;
   wherein the foreign JMS server automatically decorates configuration and deployment MBean names with the partition name; and
   wherein the foreign JMS server is usable to customize configurable attributes for the partition via overrides containing property key values; and
   providing a database associated with the partition and isolated from others of the plurality of partitions;
   wherein a name for a data source identified by the directory service API is configured in the foreign JMS server to enable a client to connect with the database associated with the partition via a Java Database Connectivity (JDBC) API connection provided by the data source.

5. The method of claim 4, wherein the foreign JMS server can be configured to reference the JNDI name of a hosted data source.

6. The method of claim 5, wherein the hosted data source is hosted at an application server.

7. A non-transitory computer readable storage medium, including instructions stored thereon which when read and executed by one or more computers cause the one or more computers to perform the steps comprising:
   providing an application server environment, together with
      a plurality of deployable resources which can be used within a domain of the application server environment, and
      a plurality of partitions, wherein each partition provides an administrative and runtime subdivision of the domain that can be associated with a tenant, and wherein each partition includes a data source declared for use by applications deployed to the partition;
   providing a directory service API configured to allow a client to look up data and objects via a name-space associated with each partition of the plurality of partitions;
   providing a foreign JMS server within a partition from the plurality of partitions which maps JMS connection factories and JMS destinations hosted remotely from the partition into a name-space associated with the partition, so that bridges and applications can access the resources by looking up names of the resources in the directory service API via the name-space associated with the partition;

wherein the foreign JMS server automatically decorates configuration and deployment MBean names with the partition name; and wherein the foreign JMS server is usable to customize configurable attributes for the partition via overrides containing property key values; and providing a database associated with the partition and isolated from others of the plurality of partitions;

wherein a name for a data source identified by the directory service API is configured in the foreign JMS server to enable a client to connect with the database associated with the partition via a Java Database Connectivity (JDBC) API connection provided by the data source.

8. The non-transitory computer readable storage medium of claim 7, wherein the foreign JMS server can be configured to reference the JNDI name of a hosted data source.

9. The non-transitory computer readable storage medium of claim 8, wherein the hosted data source is hosted at an application server.

10. The system of claim 1, wherein a JMS connection factory is returned to the client that contains a Uniform Resource Locator (URL) that is specific to the database associated with the partition with which the client is communicating.

11. The system of claim 10, wherein if the URL is not configured in the foreign JMS server mapping, the URL is configured to be automatically determined based on the data source name that is specified in the foreign JMS server and a configuration of the partition.

12. The system of claim 1, wherein bridges and applications access resources by looking up the resources in the directory service API via the name-space associated with a partition ID, and
wherein each partition is isolated from the other of the plurality of partitions by one of
inclusion of the partition ID on a thread when the JMS API is called from upon a deployment runtime, and
a context object identifying the partition.

13. The method of claim 4, wherein a JMS connection factory is returned to the client that contains a Uniform Resource Locator (URL) that is specific to the database associated with the partition with which the client is communicating.

14. The method of claim 13, wherein if the URL is not configured in the foreign JMS server mapping, the URL is configured to be automatically determined based on the data source name that is specified in the foreign JMS server and a configuration of the partition.

15. The method of claim 4, wherein bridges and applications access resources by looking up the resources in the directory service API via the name-space associated with a partition ID, and
wherein each partition is isolated from the other of the plurality of partitions by one of
inclusion of the partition ID on a thread when the JMS API is called from upon a deployment runtime, and
a context object identifying the partition.

16. The non-transitory computer readable storage medium of claim 7, wherein a JMS connection factory is returned to the client that contains a Uniform Resource Locator (URL) that is specific to the database associated with the partition with which the client is communicating.

17. The non-transitory computer readable storage medium of claim 16, wherein if the URL is not configured in the foreign JMS server mapping, the URL is configured to be automatically determined based on the data source name that is specified in the foreign JMS server and a configuration of the partition.

18. The non-transitory computer readable storage medium of claim 7, wherein bridges and applications access resources by looking up the resources in the directory service API via the name-space associated with a partition ID, and
wherein each partition is isolated from the other of the plurality of partitions by one of
inclusion of the partition ID on a thread when the JMS API is called from upon a deployment runtime, and
a context object identifying the partition.

19. The system of claim 1, further comprising:
a port dedicated for use by the partition;
wherein resources associated with JMS are accessible, via the port, to a legacy application that is not designed for a partitioned application server environment and that is instantiated in the domain or another of the plurality of partitions; and
wherein resources associated with JMS are accessible, via one or both of the port and a partition-specific URL, to an application that is designed for a partitioned application server environment and that is instantiated in the domain or another of the plurality of partitions.

20. The method of claim 4, further comprising:
providing a port dedicated for use by the partition;
wherein resources associated with JMS are accessible, via the port, to a legacy application that is not designed for a partitioned application server environment and that is instantiated in the domain or another of the plurality of partitions; and
wherein resources associated with JMS are accessible, via one or both of the port and a partition-specific URL, to an application that is designed for a partitioned application server environment and that is instantiated in the domain or another of the plurality of partitions.

* * * * *

UNITED STATES PATENT AND TRADEMARK OFFICE
CERTIFICATE OF CORRECTION

PATENT NO. : 10,103,946 B2
APPLICATION NO. : 14/865733
DATED : October 16, 2018
INVENTOR(S) : Xiao et al.

Page 1 of 1

It is certified that error appears in the above-identified patent and that said Letters Patent is hereby corrected as shown below:

In the Specification

In Column 17, Line 16, delete "URI" and insert -- URL --, therefor.

In Column 19, Line 55, delete "follows." and insert -- follows: --, therefor.

Signed and Sealed this
Thirty-first Day of December, 2019

Andrei Iancu
*Director of the United States Patent and Trademark Office*